(12) United States Patent
Zhao et al.

(10) Patent No.: US 9,364,785 B2
(45) Date of Patent: *Jun. 14, 2016

(54) DEHUMIDIFYING TOWER FOR EXHAUST GAS

(71) Applicants: Tianhua Institute of Chemical Machinery and Automation Co., Ltd, Lanzhou, Gansu Province (CN); National Engineering Research Center of Drying Technology and Equipment, Lanzhou, Gansu Province (CN)

(72) Inventors: Xu Zhao, Lanzhou (CN); Yonggong Ling, Lanzhou (CN); Yan Dou, Lanzhou (CN); Tao Shen, Lanzhou (CN); Zhongfu Zhan, Lanzhou (CN); Yongpeng Tan, Lanzhou (CN); Yan Zhang, Lanzhou (CN)

(73) Assignee: Tiahua Institute of Chemical Machinery and Automation Co., Ltd., National Engineering Research Center of Drying Technology and Equipment, Lanzhou, Gansu Province (CN)

( * ) Notice: Subject to any disclaimer, the term of this patent is extended or adjusted under 35 U.S.C. 154(b) by 508 days.

This patent is subject to a terminal disclaimer.

(21) Appl. No.: 13/926,820

(22) Filed: Jun. 25, 2013

(65) Prior Publication Data
US 2014/0000461 A1    Jan. 2, 2014

(30) Foreign Application Priority Data

Jun. 25, 2012   (CN) .......................... 2012 1 0209847

(51) Int. Cl.
B01D 53/26    (2006.01)
B01D 3/06     (2006.01)
B01D 19/00    (2006.01)

(52) U.S. Cl.
CPC ................ B01D 53/263 (2013.01); B01D 3/06 (2013.01); B01D 19/0015 (2013.01); B01D 53/265 (2013.01)

(58) Field of Classification Search
USPC .......................................................... 96/242
See application file for complete search history.

(56) References Cited

U.S. PATENT DOCUMENTS

| 2,162,838 | A  | * | 6/1939 | Cole ......................... | C10K 1/10 422/631 |
| 9,126,134 | B2 | * | 9/2015 | Zhao ...................... | B01D 47/05 |
| 2014/0060333 | A1 | * | 3/2014 | Zhao ...................... | B01D 47/05 96/181 |

* cited by examiner

*Primary Examiner* — Duane Smith
*Assistant Examiner* — Adam W Bergfelder
(74) *Attorney, Agent, or Firm* — Maschoff Brennan

(57) ABSTRACT

A dehumidifying tower having a washing section, a flash-distilling section, and a condensing section. In the washing section, exhaust gas is washed with a cooling liquid to remove at least a portion of solid dust entrained in the exhaust gas, cool the exhaust gas, and condense at least a portion of moisture in the exhaust gas into liquid. The flash-distilling section flash-distills the cooling liquid used in the washing section to produce a cooled cooling liquid and a cooling liquid vapor. Cooling liquid produced by flash-distillation enters the washing section. The flash-distilling section is in gas-phase isolation from the washing section. The condensing section condenses the cooling liquid vapor produced by flash-distillation. The condensing section is configured to be in gas-phase communication with and liquid-phase isolation from the flash-distilling section, and be in both gas-phase and liquid-phase isolation from the washing section.

19 Claims, 6 Drawing Sheets

Prior Art

DEHUMIDIFYING TOWER FOR EXHAUST GAS

CROSS-REFERENCE TO RELATED APPLICATIONS

The present application claims the priority of Chinese Patent Application No. 201210209847.1 filed on Jun. 25, 2012 and entitled "Dehumidifying Tower for Moisture-containing Exhaust Gas", the entirety of which is incorporated herein by reference.

FIELD OF THE INVENTION

The present invention relates to a dehumidifying tower for exhaust gas, and particularly to a dehumidifying tower for desorbing, cleaning, and recycling the water vapor or other moistures from the moisture-containing exhaust gas.

BACKGROUND OF THE INVENTION

A large quantity of moisture-containing exhaust gas may be produced during a process of drying, pyrolysis or the like. Said moisture-containing exhaust gas generally contains a large amount of moisture (including inorganic moisture such as water vapor; or organic moisture such as hexane, methanol, ethanol, and/or acetic acid, etc) and a small amount of solid dust from the process of drying, pyrolysis or the like. It is a conventional technique to dehumidify the moisture-containing exhaust gas with a dehumidifying tower, such as a washing and cooling tower, to remove the moisture therein, which has been applied widely in process industries such as chemical industry (e.g., petrochemical industry, coal chemical industry, etc.), steel industry, metallurgy industry and the like.

FIG. 1 shows a conventional washing and cooling tower 90, which from top to bottom comprises: a gas outlet 901, a gas demister 902, a liquid distributor 903, a filling unit 904 filled with one or more layers of fillers, a gas inlet distributor 905, a liquid overflow discharge device 906 and a liquid storage region 907 at a lower part of the tower, and a liquid outlet 908 at the bottom of the tower.

As shown in FIG. 2, a moisture-containing exhaust gas from for example the drying process enters the washing and cooling tower 90 from a gas inlet 909 near the bottom of the tower, and rises to the filling unit 904. A circulating cooling liquid condensed from the moisture enters the tower from its top, and is evenly sprayed onto the surface of the underlying filler layer through the liquid distributor 903. In the filler layer, heat exchange and mass exchange proceed between the moisture-containing exhaust gas and the circulating cooling liquid, which contact with each other in a counter-flowing manner. During this process, the moisture-containing exhaust gas is cooled by the circulating cooling liquid, so that at least a portion of moisture in the exhaust gas is condensed into liquid and joins becomes a portion of the circulating cooling liquid; while the exhaust gas is washed by the circulating cooling liquid, so that the solid dust in the exhaust gas is at least partially removed therefrom. After passing through the filling unit 904, the exhaust gas continues to rise in the tower. After demisted by the demister 902, the exhaust gas is discharged from the washing and cooling tower 90 via the gas outlet 901 by an induced draft fan 912. During the above-mentioned exchanging processes, the circulating cooling liquid is heated by the exhaust gas. The circulating cooling liquid that leaves the filler layer falls to the bottom of the tower. A portion of the circulating cooling liquid is discharged through the overflow discharge device 906 or a circulating cooling liquid pump 910 at the bottom of the tower, and becomes a recycled moisture liquid consisting of the moisture and the dust. The remaining circulating cooling liquid is discharged from the tower via the liquid outlet 908 by the circulating liquid pump 910 at the bottom of the tower, and then fed into a cooling device 920 for cooling. The cooled cooling liquid is fed again into the washing and cooling tower 90 to repeat the above processes.

However, such cooling tower in the prior art suffers from the following drawbacks.

The recycled moisture liquid obtained from the washing and cooling tower includes not only the liquid condensed from the moisture in the exhaust gas, but also solid dust entrained in the exhaust gas. Thus, a further liquid-solid separation process is required to be performed on the recycled liquid, which is technically complicated and costly.

Furthermore, the dust entrained in the moisture-containing exhaust gas may also enter the circulating cooling liquid, which tends to block the cooling device block during the cooling process for the cooling liquid, and lower the heat exchanging efficiency.

Moreover, a washing, cooling, and recycling process with using said conventional washing and cooling tower 90 requires a great number of other apparatuses or devices, and requires large work area.

SUMMARY OF THE INVENTION

An objective of the present invention is to provide a dehumidifying tower for dehumidifying a moisture-containing exhaust gas, so as to at least partially alleviate or overcome the above-mentioned drawbacks in the prior art.

To this end, according to an aspect of the invention, a dehumidifying tower is provided which comprises a washing section, a flash-distilling section, and a condensing section. The washing section is arranged at a lower part of the tower, and is adapted for washing an exhaust gas entering the tower with a cooling liquid to remove at least part of solid dust entrained in the exhaust gas, cool the exhaust gas, and condense at least a portion of moisture in the exhaust gas into liquid. The washing section comprises an exhaust gas inlet and an exhaust gas outlet at a position higher than that of the exhaust gas inlet. The flash-distilling section is arranged at an upper part of the tower, and is adapted for receiving and flash-distilling the cooling liquid that has been used in the washing section to produce a cooled cooling liquid and a cooling liquid vapor. A liquid seal means communicates the flash-distilling section with the washing section, so that the cooling liquid produced by flash-distillation is able to enter the washing section via the liquid seal means, while the flash-distilling section is in gas-phase isolation from the washing section. The condensing section is arranged between the washing section and the flash-distilling section, and is adapted for receiving and condensing the cooling liquid vapor produced by the flash-distillation. The condensed liquid is discharged from the condensing section. The condensing section is configured to be in gas-phase communication with and liquid-phase isolation from the flash-distilling section, and be in both gas-phase and liquid-phase isolation from the washing section. The flash-distilling section and the condensing section have an operating pressure lower than that of the washing section.

In the dehumidifying tower of the invention, the recycled moisture liquid obtained from flash-distilling possess under a negative pressure is a clean recycled liquid, thus avoiding the drawback in the prior art that the recycled liquid from a conventional washing, cooling and absorbing tower contains impurities.

In the invention, the vapor obtained from the flash-distilling possess under a negative pressure is clean, which will not block condensing heat exchangers. As compared with condensing technique under atmospheric pressure, the condensing technique under negative pressure according to the invention has higher efficiency in condensing, cooling, and heat exchanging.

In the dehumidifying tower of the invention, flash-distillation to the cooling liquid is carried on by using the heat carried by the exhaust gas to be dehumidified. Thus, clean recycled liquid can be produced by flash-distilling without any heat supplement.

Devices for washing, cooling, absorbing, vacuum flash-distilling, and vacuum condensing in the prior art are integrated in the dehumidifying tower of the invention, which requires only small work area.

BRIEF DESCRIPTION OF THE DRAWINGS

Reference will now be made in detail to embodiments of the present invention, examples of which are illustrated in the accompanying drawings, wherein.

DETAILED DESCRIPTION OF THE PREFERRED EMBODIMENT

The invention will now be described in details through following illustrative embodiments. However, it should be understood that an element, a structure or a feature in an embodiment can be beneficially incorporated into other embodiments without further recitation.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the present invention described herein. All references listed, cited and/or discussed in this specification are incorporated herein by reference in their entireties and to the same extent as if each reference was individually incorporated by reference.

It should also be understood that "comprises/comprising" when used in the specification is taken to specify the presence of stated features, integers, steps or components but dose not preclude the presence or addition of one or more other features, integers, steps or components or groups thereof.

Figure 1:
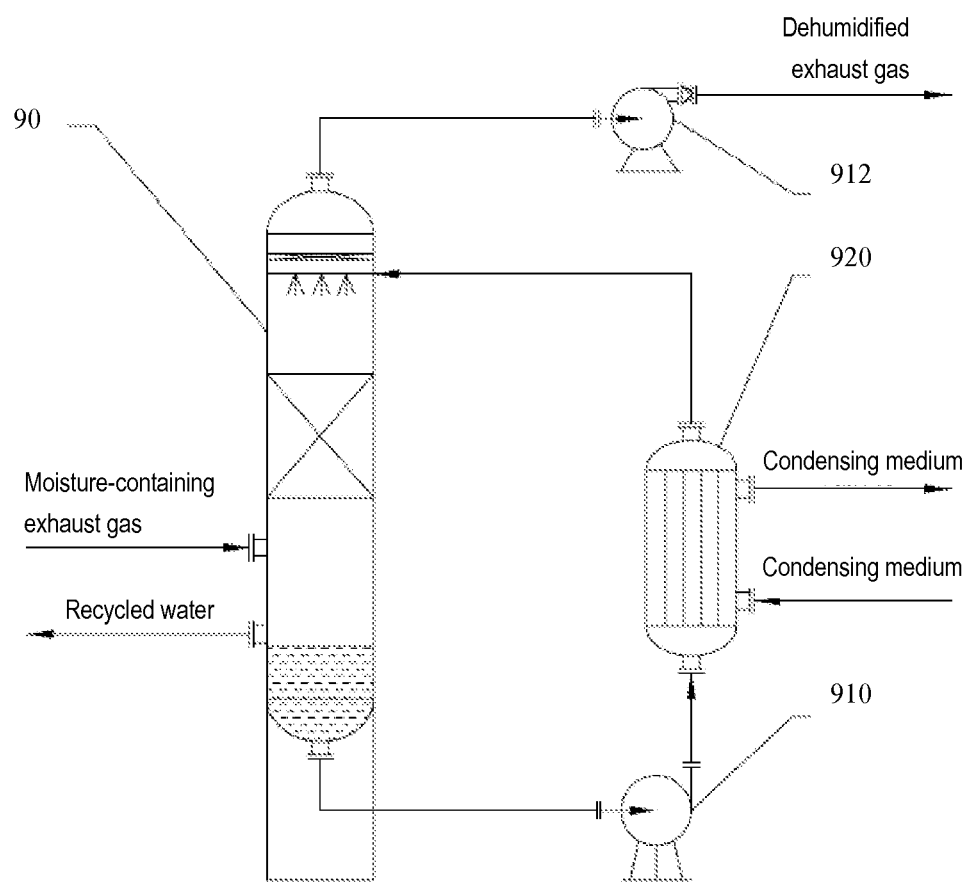
FIG. 1 is a structural diagram for an existing washing and cooling tower.
Figure 2:
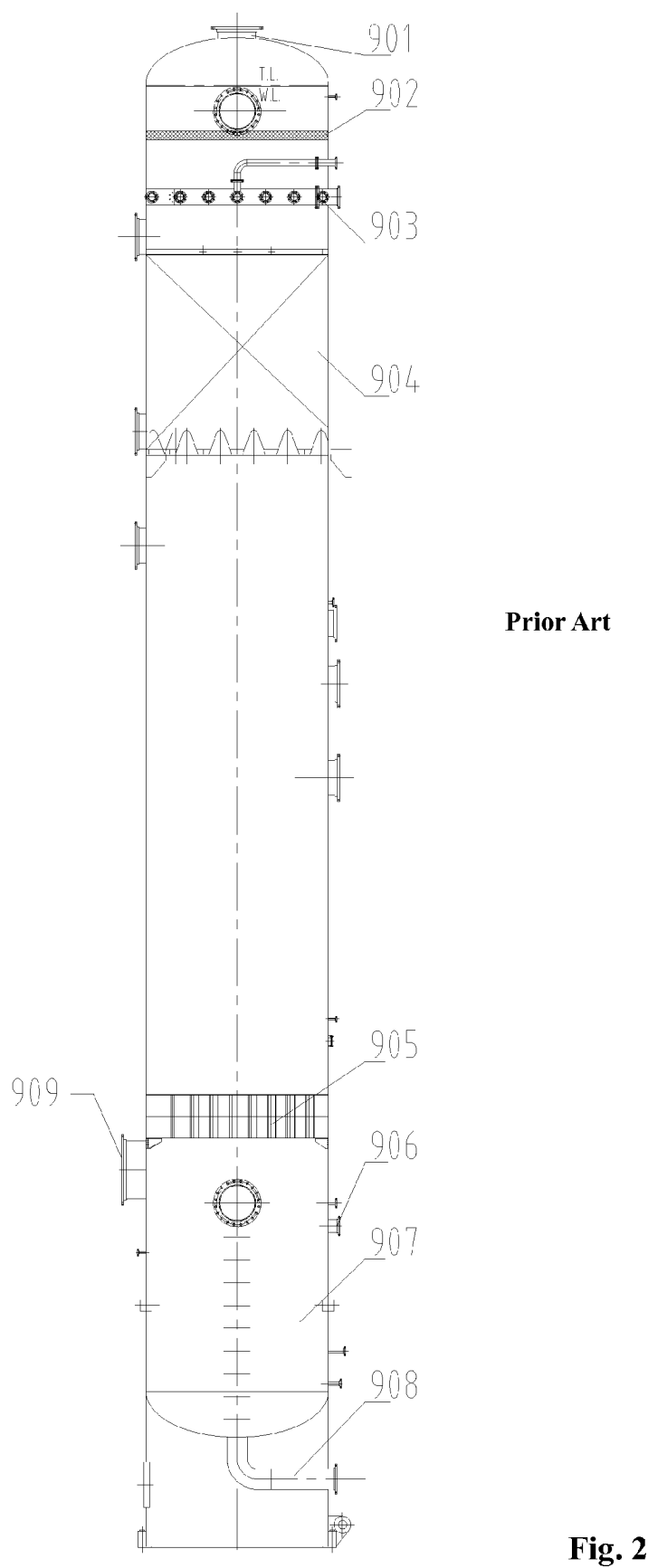
FIG. 2 is a flow chart illustrating dehumidifying processes by using a washing and cooling tower in the prior art.
Figure 3:
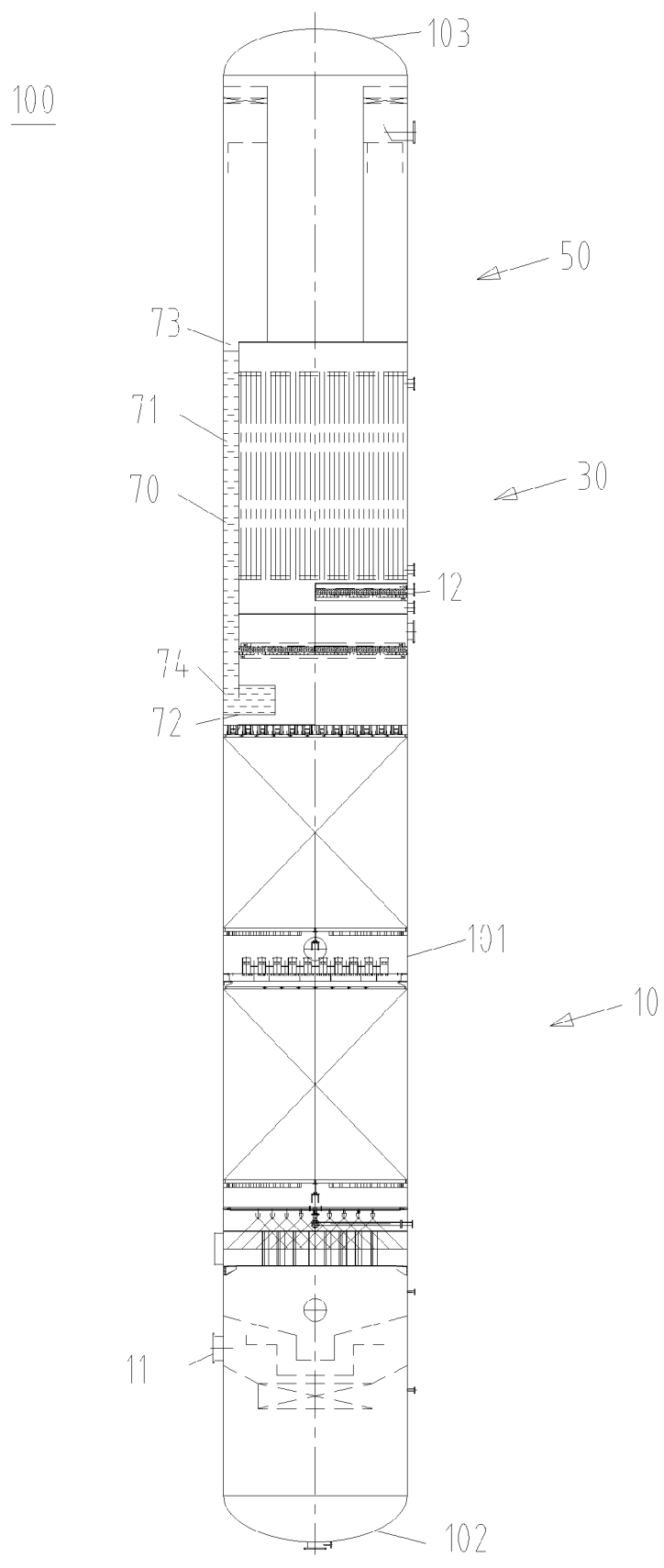
FIG. 3 is a structural diagram for a dehumidifying tower according to an embodiment of the invention.

FIG. 3 shows a dehumidifying tower 100 for exhaust gas according to an embodiment of the invention, which comprises a washing section 10 arranged at a lower part of the tower, a flash-distilling section 50 arranged at an upper part of the tower, and a condensing section 30 arranged between the washing section 10 and the flash-distilling section 50.

Exhaust gas carrying moisture (e.g. water vapor) and solid dust enters the washing section 10 via an exhaust gas inlet 11. In the washing section 10, the exhaust gas entering the tower is washed by a cooling liquid (e.g. water) so as to remove at least a portion of the solid dust entrained in the exhaust gas, and cool the exhaust gas, and condense at least a portion of the moisture in the exhaust gas into a liquid. The condensed liquid joins the cooling liquid. The exhaust gas which has been treated as above is discharged from an exhaust gas outlet 12. The exhaust gas inlet 11 and outlet 12 can be arranged on a side wall 101 of the tower, wherein the exhaust gas outlet 12 is arranged at a higher position than that of the exhaust gas inlet 11. The flash-distilling section 50 is configured for receiving the cooling liquid that has been used in the washing section 10, and flash-distilling it to produce a cooled cooling liquid and a cooling liquid vapor. A liquid seal means 70 communicates the flash-distilling section 50 with the washing section 10 in such a way that the cooling liquid produced by flash-distillation can enter the washing section 10 via said liquid seal means 70 for the process operation in the washing section 10, while the flash-distilling section 50 is in gas-phase isolation from the washing section 10. The cooling liquid vapor produced by flash-distillation is fed into the condensing section 30. The condensing section 30 receives and condenses the cooling liquid vapor produced by flash-distillation. The condensed liquid is clean, which can be discharged from the condensing section 30 for being recovered and recycled. The condensing section 30 is configured to be in gas-phase communication with and liquid-phase isolation from the flash-distilling section 50, and in both gas-phase and liquid-phase isolation from the washing section 10.

The flash-distilling section 50 and the condensing section 30 are arranged to have an operating pressure lower than that in the washing section 10. The presence of the pressure difference enables that the cooling liquid, which has been heated by the exhaust gas in the washing section 10, can be flash-distilled immediately upon reaching the flash-distilling section 50. Preferably, the operating pressure in the washing section 10 is set to be an atmospheric pressure or a slight positive pressure, while the operating pressure in the condensing section 30 and the flash-distilling section 50 is set to be a negative pressure in a range from about 2.5 kPa (A) to about 32 kPa (A).

According to an embodiment of the invention, the liquid seal means 70 comprises a downspout 71 and a liquid receiving disc 72. The downspout 71 is arranged abut the condensing section 30, with one end 73 communicating with the flash-distilling section 50 and the other end 74 communicating with the liquid receiving disc 72. The liquid receiving disc 72 is arranged in a headspace of the washing section 10 and communicated with the washing section 10 so as to provide the washing section 10 with the cooling liquid from the flash-distilling section 50. The liquid receiving disc 72 has a predetermined liquid storage height. In this way, on one hand, the cooling liquid in the flash-distilling section 50 is able to enter the washing section 10 via the downspout 71 and the liquid receiving disc 72 for the process operation in the washing section 10. On the other hand, the liquid within the downspout 71 and the liquid receiving disc 72 realizes the gas-phase isolation between the flash-distilling section 50 and the washing section 10. Furthermore, since the height of the downspout 71 is greater than the liquid storage height of the liquid receiving disc 72, it is ensured that there is a pressure difference between the flash-distilling section 50 and the washing section 10. The downspout 71 can be of for example a round-section downspout or an arched-section downspout. The liquid receiving disc 72 can be of for example a flat type or a concave type liquid receiving disc.

Preferably, the liquid seal means 70 can be further provided with a control valve for controlling the flow rate of the cooling liquid from the flash-distilling section 50 to the condensing section 10.

Figure 4:
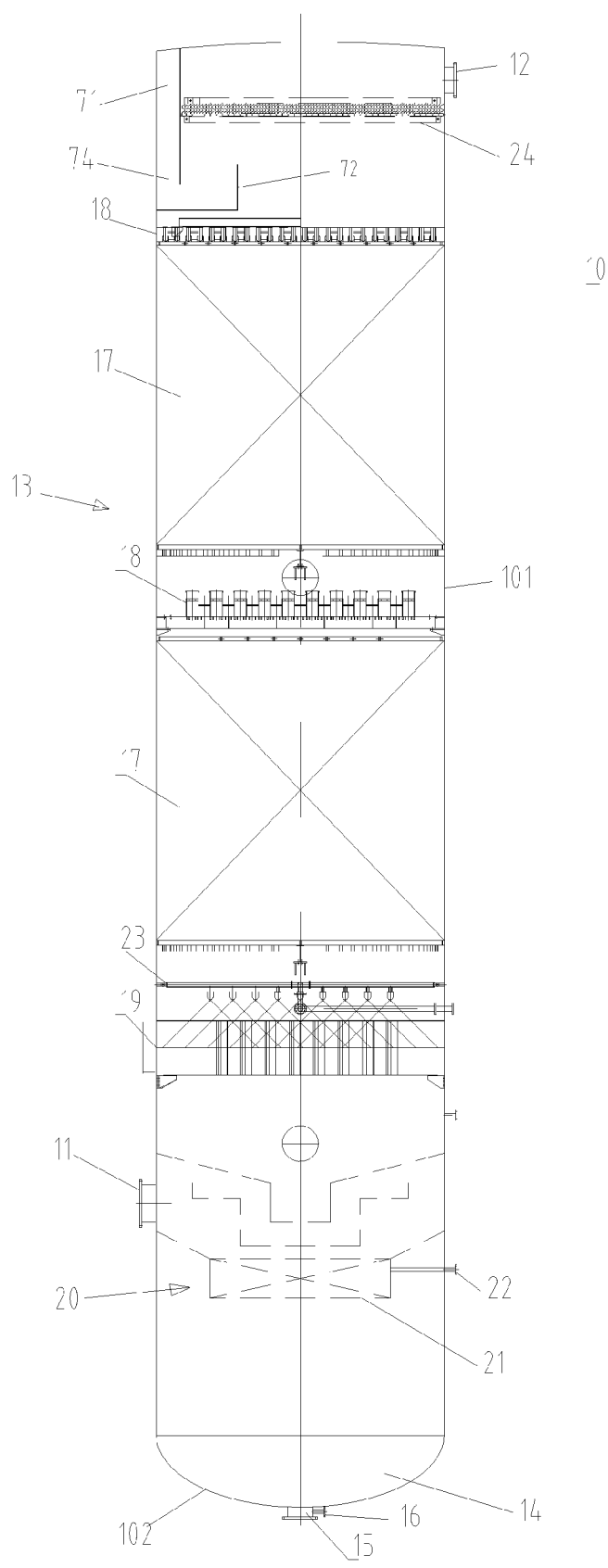
FIG. 4 is an enlarged schematic view showing a washing section of the dehumidifying tower in FIG. 3.

As shown in FIG. 4, according to an embodiment of the invention, the washing section 10 comprises a filler segment 13 arranged within the tower, a liquid storage segment 14 arranged at the bottom of the tower 100, and a cooling liquid outlet 15 extending from a bottom wall 102 of the tower. The filler segment 13 is arranged between the exhaust gas inlet 11 and the exhaust gas outlet 12 in a vertical direction, in which the cooling liquid from the flash-distilling section 50 and the exhaust gas entering the tower via the exhaust gas inlet 11 contact with each other in a counter-flowing manner. During such counter-flowing contact, the exhaust gas is cooled by the cooling liquid, so that at least a portion of the moisture in the exhaust gas is condensed into liquid and becomes a portion of the cooling liquid, while at least a portion of the solid dust entrained in the exhaust gas is removed therefrom by washing by the cooling liquid. The liquid storage segment 14 is used for storing the cooling liquid falling from the filler segment 13. The stored cooling liquid can be discharged from the washing section via the cooling liquid outlet 15, and also can be fed into the flash-distilling section 50 by for example a pump arranged outside the tower. The liquid storage segment 14 can be provided with a liquid discharging means with a liquid seal and/or a port with high/low liquid level detector.

The cooling liquid falling from the filler segment 13 contains the solid dust removed from the exhaust gas. According to an embodiment of the invention, a quantitative discharging port 16 branches from the cooling liquid outlet 15, for quantitatively discharging the cooling liquid within the liquid storage segment 14, so as to maintain the solid dust content in the dehumidifying tower 100 within a predetermined range.

According to an embodiment of the invention, the filler segment 13 comprises at least one filling unit 17 having one or more layers of fillers and at least one liquid distributor 18, wherein above each filling unit 17 there is arranged one liquid distributor 18. The arrangement of the filling unit 17 enables the increase of the contact time and the contact section between the exhaust gas and the cooling liquid, so that the exhaust gas can be better washed and cooled. The liquid distributor 18 enables the cooling liquid to evenly fall onto the corresponding filling unit 17. In the example shown in FIG. 4, two filling units 17 and two liquid distributors 18 are arranged. The fillers in the filling unit 17 can be one or more selected from a bulk filler, a regular filler, a general sieve plate, an oriented sieve plate, and a multiple-downspout sieve plate. The liquid distributor 18 can be for example of a conventional liquid distributor for a tower, a mesh-disc-type distributor, a detachable-slot-plate-type gas/liquid distributor, or an overflow-disc-type liquid distributor.

According to an embodiment of the invention, an exhaust gas distributor 19 is arranged below the filler segment 13, through which the exhaust gas input from the exhaust gas inlet 11 can be evenly provided to the filler segment 13. According to an embodiment of the invention, a spraying segment is arranged between the filler segment 13 and the exhaust gas distributor 19, so that the exhaust gas can be pre-cooled and pre-washed before reaching the filler segment 13. The spraying segment can comprises a liquid sprayer 23, which can be of a conventional type from Spraying Systems Co for example. The liquid used by the sprayer 23 can be the cooling liquid falling from above, or can be provided from the outside, or can be provided by a clean condensed liquid discharged from the condensing section 30.

Non-condensable gas, such as oxygen, nitrogen in the air or like, which cannot be condensed, may be dissolved in the cooling liquid falling from the filler segment 13. The presence of such non-condensable gas will increase the quantity of the non-condensable gas precipitated during the subsequent flash-distilling possess of the cooling liquid. According to an embodiment of the invention, a non-condensable gas removing segment 20 is arranged between the filler segment 13 and the liquid storage segment 14. The non-condensable gas removing segment 20 comprises a filler layer 21 and a vapor inlet 22 extending from the side wall 101 of the tower to said filler layer. Thus, a vapor in high temperature can enter the filler layer 21 via the vapor inlet 22 and thus heats the cooling liquid passing through the filler layer 21, so that the non-condensable gas decreases in dissolvability and volatilizes from the cooling liquid. Thus, the quantity of the non-condensable gas in the cooling liquid entering the flash-distilling section 50 can be minimized. The filler in the filler layer 21 can be a bulk filler such as a Pall ring, a ladder ring, or a modified Pall ring, which is made by metal or plastics material; or a regular filler such as a wave mesh filler, or a corrugated filler; or a combination of the foregoing fillers. The vapor in high temperature that is fed via the vapor inlet 22 can be provided by an external vapor source (not shown).

According to an embodiment of the invention, a gas demister 24 is arranged between the filler segment 13 and the exhaust gas outlet 12, for removing mist droplets entrained in the exhaust gas before the exhaust gas is discharged via the exhaust gas outlet 12, so as to further increase the dryness of the discharged exhaust gas. The liquid receiving disc 72 of the liquid seal means 70 has an opening in the washing section 10, which is arranged below the gas demister 24. According to the present invention, the demister 24 may be a conventional demister, such as a filler-type demister, a screen-type demister, a baffle-plate-type demister, or the like.

Figure 5:
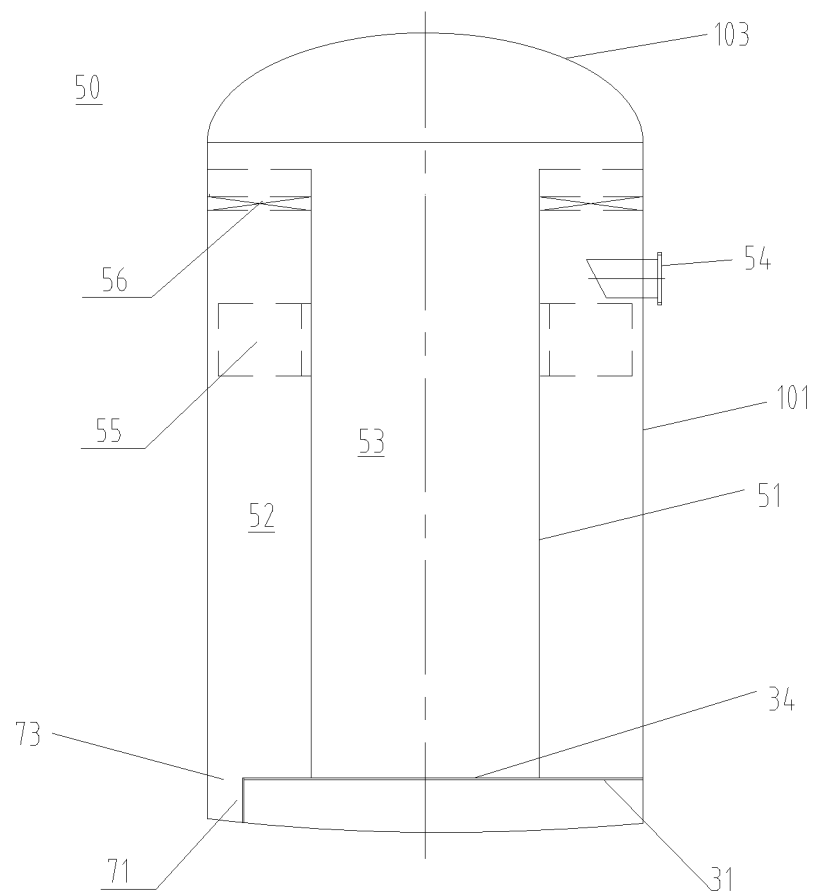
FIG. 5 is an enlarged schematic view showing a flash-distilling section of the dehumidifying tower in FIG. 3.

Reference is made to FIG. 5, which shows an enlarged schematic view of the flash-distilling section of the dehumidifying tower according to an embodiment of the invention. The flash-distilling section 50 is provided with a hollow inner tube 51 with a predetermined height. An annular space 52 for flash-distilling is formed between the inner tube 51 and the side wall of the tower. The inner tube 51 may be of an annular or cylindrical shape, and made from a material depending on the corrosive substance in the exhaust gas.

The downspout 71 of the liquid seal means 70 communicates the annular space 52 with the washing section 10. A hollow interior 53 of the inner tube 51 is communicated with the condensing section 30 underlying the flash-distilling section 50 and is separated from the top wall 103 of the tower by a space, so that the cooling liquid vapor produced by flash-distillation is able to enter the condensing section 30 via said space and the inner tube 51.

According to an embodiment of the invention, the flash-distilling section 50 comprises a cooling liquid inlet 54 arranged on the wall of the tower and extending into the annular space 52 for receiving the cooling liquid from the liquid storage segment 14 of the washing section 10, and a cooling liquid distributor 55 arranged in the annular space 52. The cooling liquid distributor 55 is arranged below the cooling liquid inlet 54, for evenly distributing the cooling liquid from the cooling liquid inlet 54 to the below annular space 52. The cooling liquid distributor 55 can be for example a conventional liquid distributor for towers, a mesh-disc-type distributor, a detachable-slot-disc-type gas/liquid distributor, or an overflow-disc-type liquid distributor.

According to an embodiment of the invention, the flash-distilling section 50 further comprises a demister 56 for demisting the cooling liquid vapor produced by the flash-distillation. The demister 56 is arranged at the top of the annular space 52 and above the cooling liquid inlet 54. The demister 56 can be a conventional demister, such as a filler-type demister, a screen-type demister, a baffle-plate-type demister, or the like.

Figure 6:
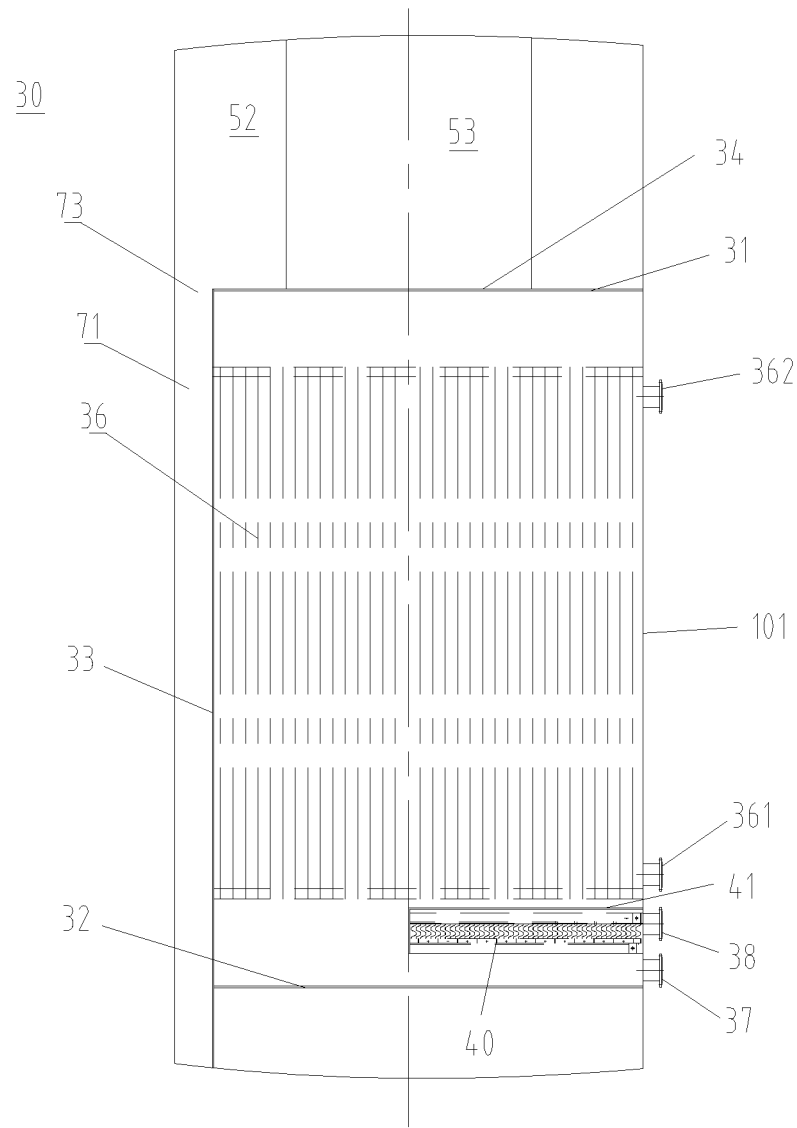
FIG. 6 is an enlarged schematic view showing a condensing section of the dehumidifying tower in FIG. 3.

Reference is made to FIG. 6, which shows an enlarged schematic view of the condensing section of the dehumidifying tower according to an embodiment of the invention. The condensing section 30 comprises a top plate 31 isolating the condensing section 30 from the flash-distilling section 50, a bottom plate 32 isolating the condensing section 30 from the washing section 10, and a side plate 33 connected between the top plate 31 and the bottom plate 32 for isolating the condensing section 30 from the liquid seal means 70. The top plate 31 is provided with a first opening 34 and a second opening 35. The inner tube 51 is communicated with the condensing section 30 via the first opening 34. An end 73 of the downspout 71 of the liquid seal means 70 is communicated with the annular space 52 via the second opening 35. However, the annular space 52 is completely isolated from the condensing section 30 by the top plate 31, so that the cooling liquid in the flash-distilling section 50 can not enter the condensing section 30.

According to an embodiment of the invention, the condensing section 30 comprises a condenser 36. The condenser 36 receives the cooling liquid vapor from the flash-distilling section 50 from its top, condenses the received cooling liquid vapor into liquid, and discharges the condensed liquid from its bottom. The condenser 36 comprises a condensing medium inlet 361 and a condensing medium outlet 362, which extend from the side wall 101 of the tower, respectively. The condenser 36 can be a heat exchanging and cooling element, e.g., heat exchanging pipes with a diameter of 12-50 mm. The heat exchanging pipes can be stainless steel pipes, copper pipes, or carbon steel pipes. The condensing section 30 further comprises a condensed liquid outlet 37, which is arranged on the side wall 101 of the tower and near the bottom of the condensing section 30, and adapted for discharging the condensed liquid stored in the condensing section 30.

According to an embodiment of the invention, the condensing section 30 further comprises a non-condensable gas outlet 38, which is arranged on the side wall 101 of the tower and between the condensed liquid outlet 37 and the condenser 36. A sucking pump (e.g., a vacuum pump, not shown) can be arranged outside the tower and connected to the condensed liquid outlet 37, so as to discharge the non-condensable gas from the condensing section 30.

According to an embodiment of the invention, the condensing section 30 further comprises a demister 40 for removing mist droplets entrained in the non-condensable gas before said non-condensable gas being discharged via the outlet 38. The demister 40 is arranged below the condenser 36, and is communicated with the non-condensable gas outlet 38. The demister 40 is covered with a cover plate 41, which isolates the demister 40 from the condenser 36 to prevent the condensed liquid falling from the condenser 36 from falling onto the demister 40. As shown in FIG. 6, the demister 40 occupies only a portion of cross-sectional area of the condensing section 30, so that the condensed liquid falling from the condenser 36 can reach the bottom of the condensing section 30 through another portion of the cross-sectional area of the condensing section 30. According to the invention, the demister 40 can be a conventional demister, such as a filler-type demister, a screen-type demister, a baffle-plate-type demister, or the like.

Hereinafter, the operation process of the dehumidifying tower of the invention will be described by referring to a detailed embodiment.

Under the action of an induced draft fan, the exhaust gas of about 85° C. to about 150° C. containing moisture such as water and a small amount of solid dust enters the washing section 10 via the exhaust gas inlet 11, passes through the exhaust gas distributor 15, and reaches the spraying segment 23, in which the exhaust gas is sprayed with the cooling liquid for being pre-washed and pre-cooled. Then, the exhaust gas enters the filling unit 17. The cooling liquid which has been cooled by flash-distillation is evenly sprayed over the filling unit 17 by the liquid distributor 18. In the filling unit 17, the exhaust gas and the cooling liquid are contacted with each other in a gas/liquid counter-flowing manner, so as to realize heat exchange and mass exchange (in which at least a portion of the moisture in the exhaust gas is cooled into liquid and becomes a portion of the cooling liquid). The exhaust gas after the counter-flowing contact decreases its temperature into about 20° C. to about 70° C., and is demisted by the gas demister 24 and then discharged from the tower via the exhaust gas outlet 12. In this way, the washing, dehumidifying, and cooling processes for the moisture-containing exhaust gas is completed.

The cooling liquid is heated by the exhaust gas to about 40° C. to about 100° C. in the filling unit 17 during the counter-flowing contact, and then falls down from the filling unit 17 to the non-condensable gas removing segment 20. The cooling liquid passes through the filler layer 21 to remove the non-condensable gas that has been dissolved therein. After that, the cooling liquid continues to fall and reach the liquid storage segment 14 at the bottom of the tower. By means of an overflow means at the bottom of the tower or a circulating cooling liquid pump arranged outside the tower, a small quantity of cooling liquid is discharged quantitatively via the quantitative discharging port 16 to become a quantitative discharging liquid, so that the solid dust washed from the exhaust gas can be quantitatively discharged. The remaining cooling liquid is fed into the annular space 52 of the flash-distilling section 50 via the cooling liquid inlet 54 by means of the circulating liquid pump arranged outside the tower.

In the annular space 52, the cooling liquid with a temperature of about 40° C. to about 100° C. is flash-distilled under a negative pressure of e.g. 2.5 kPa (A) to 32 kPa (A), to produce the cooling liquid with a temperature of about 20° C. to about 70° C. and the cooling liquid vapor with a temperature of about 30° C. to about 70° C. The cooled cooling liquid enters the washing section 10 through the liquid seal means 70, so as to continue its circulation of washing the exhaust gas, and then being cooled, and then being condensed. The cooling liquid vapor produced by flash-distillation is demisted by the demister 56, and then enters the condensing section 30 through the internal space 53 of the inner tube and the first opening 34 in the top plate 31 of the condensing section.

In the condensing section 30, the cooling liquid vapor is condensed into liquid with a temperature of about 20° C. to about 70° C. by the condenser 36, which liquid is a clean recycled moisture liquid and is discharged via the condensed liquid outlet 37. The non-condensable gas which is not condensable is demisted by the demister 40, and then discharged via the outlet 38 under the sucking action of a vacuum pump outside the tower.

Although several preferred embodiments of the present invention have been described, the present invention may be used with other configurations. It will be appreciated by those skilled in the art that, the present invention could have many other embodiments, and changes and modifications may be made thereto without departing from the invention in its broader aspects and as set forth in the following claims and equivalents thereof.

What is claimed is:

1. A dehumidifying tower for exhaust gas, comprising:
a washing section arranged at a lower part of the tower and adapted for washing an exhaust gas entering the tower with a cooling liquid so as to remove at least a portion of solid dust entrained in the exhaust gas, cool the exhaust gas, and condense at least a portion of moisture in the exhaust gas into a liquid, said washing section comprising an exhaust gas inlet and an exhaust gas outlet at a position higher than that of the exhaust gas inlet;
a flash-distilling section arranged at an upper part of the tower and adapted for receiving and flash-distilling the cooling liquid that has been used in the washing section to produce a cooled cooling liquid and a cooling liquid vapor, wherein a liquid seal means communicates the flash-distilling section with the washing section in such a way that the cooling liquid produced by flash-distillation is able to enter the washing section via the liquid seal means, while the flash-distilling section is in gas-phase isolation from the washing section; and
a condensing section arranged between the washing section and the flash-distilling section and adapted for receiving and condensing the cooling liquid vapor produced by flash-distillation, wherein the condensed liquid is discharged from the condensing section, and wherein the condensing section is configured to be in gas-phase communication with and liquid-phase isolation from the flash-distilling section, and be in both gas-phase and liquid-phase isolation from the washing section,
wherein the flash-distilling section and the condensing section have an operating pressure lower than that of the washing section.

2. The dehumidifying tower for exhaust gas according to claim 1, wherein the liquid seal means comprises a downspout and a liquid receiving disc, wherein the downspout is arranged abut the condensing section, with one end communicating with the flash-distilling section and the other end communicating with the liquid receiving disc, and wherein the liquid receiving disc is arranged in a headspace of the washing section and communicated with the washing section, and has a predetermined liquid storage height.

3. The dehumidifying tower for exhaust gas according to claim 2, wherein the liquid seal means further comprises a control valve for controlling a flow rate of the cooling liquid from the flash-distilling section to the condensing section.

4. The dehumidifying tower for exhaust gas according to claim 1, wherein the washing section comprises:
a filler segment arranged between the exhaust gas inlet and the exhaust gas outlet in a vertical direction, in which the cooling liquid from the flash-distilling section and the exhaust gas from the exhaust gas inlet contact with each other in a counter-flowing manner;
a liquid storage segment arranged at a bottom of the tower, for storing the cooling liquid falling from the filler segment; and
a cooling liquid outlet arranged at a bottom wall of the tower, via which the cooling liquid in the liquid storage segment can be discharged from the washing section and fed into the flash-distilling section.

5. The dehumidifying tower for exhaust gas according to claim 4, wherein the filler segment comprises at least one liquid distributor and at least one filling unit having one or more layers of fillers, wherein above each filling unit there is one liquid distributor.

6. The dehumidifying tower for exhaust gas according to claim 5, wherein the fillers comprises one or more selected from a bulk filler, a regular filler, a general sieve plate, an oriented sieve plate, and a multiple-downspout sieve plate.

7. The dehumidifying tower for exhaust gas according to claim 4, wherein the washing section further comprises a non-condensable gas removing segment arranged between the filler segment and the liquid storage segment, said non-condensable gas removing segment comprising:
a filler layer, and
a vapor inlet extending from a side wall of the tower to the filler layer and allowing a vapor to enter the filler layer via said vapor inlet, so that the cooling liquid passing through the filler layer is heated to volatilize the non-condensable gas in the cooling liquid.

8. The dehumidifying tower for exhaust gas according to claim 4, wherein the washing section further comprises an exhaust gas distributor arranged below the filler segment, through which the exhaust gas input through the exhaust gas inlet is evenly provided to the filler segment.

9. The dehumidifying tower for exhaust gas according to claim 8, wherein the washing section further comprises a spraying segment arranged between the filler segment and the exhaust gas distributor, for pre-cooling and pre-washing the exhaust gas before the exhaust gas reaches the filler segment.

10. The dehumidifying tower for exhaust gas according to claim 4, wherein the washing section further comprises a gas demister arranged between the filler segment and the exhaust gas outlet, for removing mist droplets entrained in the exhaust gas before the exhaust gas is discharged from the exhaust gas outlet, wherein an opening of the liquid seal means to the washing section is arranged below the gas demister.

11. The dehumidifying tower for exhaust gas according to claim 4, wherein the washing section comprise a quantitative discharging port, which branches from the cooling liquid outlet, and is adapted for quantitatively discharging the cooling liquid in the liquid storage segment in order to maintain the solid dust content in the dehumidifying tower within a predetermined range.

12. The dehumidifying tower for exhaust gas according to claim 1, wherein the flash-distilling section comprises a hollow inner tube with a predetermined height, and wherein an annular space for flash-distilling is formed between the inner tube and the side wall of the tower, the liquid seal means communicating the annular space with the washing section, the inner tube being communicated with the condensing section and separated from a top wall of the tower by a space, so that the cooling liquid vapor produced by flash-distillation is able to enter the condensing section via said space and the inner tube.

13. The dehumidifying tower for exhaust gas according to claim 12, wherein the flash-distilling section comprises:
a cooling liquid inlet arranged in the side wall of the tower and extending into the annular space for receiving the cooling liquid from the washing section; and
a cooling liquid distributor arranged in the annular space and below the cooling liquid inlet, for evenly distributing the cooling liquid from the cooling liquid inlet into the annular space below.

14. The dehumidifying tower for exhaust gas according to claim 13, wherein the flash-distilling section further comprises a demister for demisting the cooling liquid vapor produced by flash-distillation, wherein the demister is arranged in a top portion of the annular space and above the cooling liquid inlet.

15. The dehumidifying tower for exhaust gas according to claim 12, wherein the condensing section comprises:
   a top plate for separating the condensing section from the flash-distilling section, wherein the top plate is provided with a first opening, through which the inner tube is communicated with the condensing section, and a second opening, through which the liquid seal means is communicated with the annular space;
   a bottom plate for separating the condensing section from the washing section; and
   a side plate connected between the top plate and the bottom plate, for separating the condensing section from the liquid seal means.

16. The dehumidifying tower for exhaust gas according to claim 1, wherein the condensing section comprises:
   a condenser for receiving the cooling liquid vapor from the flash-distilling section from a top of the condenser, condensing the received cooling liquid vapor into liquid, and discharging the condensed liquid from a bottom of the condenser, wherein the condenser comprises a condensing medium inlet and a condensing medium outlet extending from the wall of the tower, respectively; and
   a condensed liquid outlet arranged in the side wall of the tower and close to the bottom of the condensing section, for discharging the condensed liquid stored in the condensing section.

17. The dehumidifying tower for exhaust gas according to claim 16, wherein the condensing section further comprises a non-condensable gas outlet, which is arranged on the side wall of the tower and between the condensed liquid outlet and the condenser, and connected with a sucking pump so as to discharge the non-condensable gas in the condensing section.

18. The dehumidifying tower for exhaust gas according to claim 17, wherein the condensing section further comprises:
   a demister for removing mist droplets entrained in the non-condensable gas before the non-condensable gas is discharged from the non-condensable gas outlet, wherein the demister is arranged below the condenser and communicated with the non-condensable gas outlet, and wherein the demister occupies only a portion of cross-sectional area of the condensing section; and
   a cover plate covering over the demister, for separating the demister from the condenser.

19. The dehumidifying tower for exhaust gas according to claim 1, wherein the washing section has a pressure of an atmospheric pressure, while the flash-distilling section and the condensing section have a pressure of 2.5 kPa (A) to 32 kPa (A).

* * * * *